United States Patent [19]

Queneau et al.

[11] 4,320,096
[45] Mar. 16, 1982

[54] COMBINED AUTOCLAVE SODA DIGESTION OF WOLFRAMITE AND SCHEELITE

[75] Inventors: Paul B. Queneau; Dale K. Huggins, both of Golden; Leo W. Beckstead, Arvada, all of Colo.

[73] Assignee: Amax Inc., Greenwich, Conn.

[21] Appl. No.: 225,905

[22] Filed: Jan. 19, 1981

[51] Int. Cl.$^3$ ............................................. C01G 41/00
[52] U.S. Cl. ........................................ 423/61; 423/53; 423/58
[58] Field of Search ............................ 423/53, 58, 61; 75/101 R

[56] References Cited

U.S. PATENT DOCUMENTS

| | | | |
|---|---|---|---|
| 2,351,678 | 6/1944 | Hall | 423/58 |
| 3,429,693 | 2/1969 | Bauer et al. | 423/61 |
| 4,092,400 | 5/1978 | Zbranek et al. | 423/58 |
| 4,167,555 | 9/1979 | Gomes et al. | 423/61 |

OTHER PUBLICATIONS

Grigoriu et al., "Chemical Absts.", vol. 61, 1964, #9209a.

Naser, "Chemical Absts.", vol. 61, 1964, #5251a.
Zelikmann et al., "Chemical Absts.", vol. 89, 1978, #133090p.

Primary Examiner—Herbert T. Carter
Attorney, Agent, or Firm—Michael A. Ciomek; Eugene J. Kalil

[57] ABSTRACT

A process for the soda digestion of mixed wolframite and scheelite concentrates is provided, the process comprising forming a slurry of the mixed wolframite and scheelite concentrates in an aqueous sodium carbonate solution and then digesting the slurry in an autoclave at a temperature of at least about 180° C. During digestion a predetermined amount of sodium hydroxide is added calculated stoichiometrically to react with $NaHCO_3$ formed as a result of the hydrolysis of $FeCO_3$ or $FeCO_3$ and $MnCO_3$ produced during the digestion of the wolframite and convert it to $Na_2CO_3$. The concentration of the $Na_2CO_3$ solution is substantially inversely correlated to the digestion temperature and substantially directly correlated to the $Na_2CO_3/WO_3$ weight ratio ranging from about 0.9 to 2 such as to effect dissolution of at least about 95% of the $WO_3$ in the concentrate and provide a pregnant liquor containing said $WO_3$.

19 Claims, No Drawings

COMBINED AUTOCLAVE SODA DIGESTION OF WOLFRAMITE AND SCHEELITE

This invention relates to a process for the extraction of tungsten from a blend of wolframite and scheelite concentrates and, in particular, to the soda ash digestion of a mixture of wolframite and low-grade scheelite concentrates.

This application is related to U.S. application Ser. No. 225,914, filed Jan. 19, 1981, the disclosure of which is incorporated herein by reference, said application being referred to herein as a related application.

STATE OF THE ART

Sodium hydroxide has been used for the digestion of wolframite concentrates for many years. Typical processing conditions presently employed comprise digesting fairly high-grade wolframite concentrate (>60% $WO_3$) in an autoclave at about 160° C. for about 2 to 4 hours using sufficient NaOH to generate about 180 grams per liter (gpl) $WO_3$ at about 98+% extraction recovery. Alternatively, wolframite can be leached at atmospheric pressure, typically for 4 to 12 hours at 115° C. by using a substantial excess of about 350 to 500 gpl NaOH. The pregnant liquor obtained is either partially neutralized, and/or sent to $SiO_2$-Mo removal operations or, in the alternative, concentrated by evaporation to crystallize sodium tungstate. When processing high-grade wolframite concentrate in accordance with the foregoing, the reagent consumed amounts to about 0.55 g NaOH/g$WO_3$. The use of crystallization to recover the tungsten as sodium tungstate crystals allows for the recycle of excess caustic which enables attainment of lower NaOH consumption, i.e., to about 0.4 g/g$WO_3$. Stoichiometrically, it takes about 0.35 grams of NaOH to react with each gram of $WO_3$.

It is known to treat scheelite concentrates by soda digestion in an autoclave, one method being disclosed in U.S. Pat. No. 2,351,678. The dissolution of the concentrate is carried out at an elevated temperature in the range of about 380° F. to 390° F. (193° C. to 199° C.) in an autoclave at a pressure of about 200 lbs/in², the amount of soda ash ($Na_2CO_3$) generally used being about 2 or more parts by weight to 1 part by weight of $WO_3$ equivalent.

RELATED APPLICATION

In related copending application Ser. No. 225,914, an improved process is disclosed for the soda ash ($Na_2CO_3$) digestion of scheelite concentrates, particularly low-grade scheelite concentrates containing by weight about 2% to 40% $WO_3$, generally about 5% to 30%, e.g., about 10% to 20%. The process is based on the recognition that a surprising interaction occurs between the soda ash concentration, the $Na_2CO_3/WO_3$ weight ratio, the aqueous tungsten concentration in the pregnant liquor, and the temperature employed in the digestion of scheelite concentrates in aqueous soda ash solution.

The recognition of the interrelationships between the aforementioned four parameters has enabled a substantial reduction in the amount of soda ash required to attain the desired tungsten extraction, has minimized the excess soda ash in the pregnant liquor, has provided maximum yield of the tungsten, and minimized dissolution of gangue minerals. The maintenance of a low quantity of soda ash in the autoclave discharge pregnant liquor is important in that as the quantity of soda ash discharged increases, so does the subsequent sulfuric acid demand, the volume of gas evolved during the subsequent $MoS_3$ precipitation from the pregnant liquor and also the amount of sodium sulfate in the solvent extraction raffinate.

One embodiment of the process disclosed in the related application comprises forming a slurry of scheelite concentrate in an aqueous sodium carbonate solution of concentration ranging from about 50 gpl to 200 gpl at a relatively low $Na_2CO_3/WO_3$ weight ratio of about 0.9 to 1.6 and then digesting said slurry in an autoclave at a temperature ranging from about 180° C. to 310° C. (at a pressure ranging from about 145 psig to 1430 psig), e.g., about 200° C. to 250° C. or 270° C., preferably from about 200° C. to 235° C.

Consistently high extraction efficiency is obtained by employing the $Na_2CO_3$ concentration of the leach solution in substantially inverse relationship with the digestion temperature and in substantially direct relationship with the $Na_2CO_3/WO_3$ weight ratio, the relationship selected being such as to effect dissolution of at least about 95% of the $WO_3$ in the concentrate, preferably at least about 97%, and provide a pregnant liquor containing said $WO_3$. The soda ash concentration preferably ranges from about 75 gpl to 175 gpl and, more preferably, from about 75 gpl to 150 gpl, while the $Na_2CO_3/WO_3$ weight ratio preferably ranges from about 1 to 1.6, and generally from about 1 to 1.4, while inhibiting substantial dissolution of gangue in the concentrate.

According to the copending application, the higher the digestion temperatures, the less is the amount of soda ash needed to achieve high tungsten extraction and the greater is the $WO_3/Na_2CO_3$ ratio in the pregnant solution. Moreover, it has been observed that the higher the initial concentration of $Na_2CO_3$, the higher the weight ratio of $Na_2CO_3/WO_3$ needed to obtain $WO_3$ extraction in excess of 95%, e.g., at least about 97% or 98%.

While wolframite concentrates can be leached to a certain degree with soda ash, a disadvantage of the process as applied to such concentrates is that considerable hydrolysis of byproduct iron and manganese carbonate occurs which results in the formation of corresponding metal hydroxide which converts ($CO_3^=$)aq to ($HCO_3^-$)aq acid salt, the accumulation of which adversely slows up or stops the reaction, thus requiring an increase in soda ash consumption.

Wolframite has the general formula (Fe, Mn)$WO_4$ and depending upon the amount of Fe and/or Mn present can take the form of other tungsten-containing minerals and may approach the heubnerite composition. Thus, the term "wolframite" employed herein is understood to include modified compositions thereof, such as ferberite, huebnerite, etc. A wolframite mineral containing both iron and manganese and which has the properties of huebnerite is one, for example, containing by weight about 77%$WO_3$, about 8%FeO and about 15%MnO.

The typical reactions that take place with regard to the formation of $NaHCO_3$ is given below as to both $FeCO_3$ and $MnCO_3$.

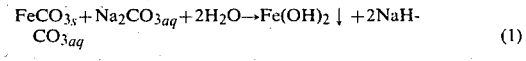

$$FeCO_{3s} + Na_2CO_{3aq} + 2H_2O \rightarrow Fe(OH)_2 \downarrow + 2NaHCO_{3aq} \quad (1)$$

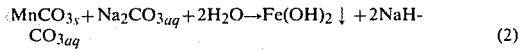

$$MnCO_{3s} + Na_2CO_{3aq} + 2H_2O \rightarrow Fe(OH)_2 \downarrow + 2NaHCO_{3aq} \quad (2)$$

Because it may be desirable and efficient to use caustic leach (NaOH) on wolframite concentrates as opposed to the use of soda ash ($Na_2CO_3$) for scheelite concentrates, two separate leach trains would be conventionally employed to carry out the two processes. This requires the use of separate equipment; one for caustic digestion of wolframite, the other for the soda ash digestion of scheelite. In addition, the two processes require separate feed preparation, separate filtration and separate grinding, where necessary.

The autoclave equipment for wolframite digestion is expensive since it requires the use of corrosion resistant materials, particularly in the construction of the autoclave; for example, Inconel-clad steel (Inconel is a trademark for a nickel-base alloy containing approximately 15%Cr, 7%Fe and the balance nickel).

On the other hand, the autoclave equipment employed for the soda ash digestion need only be plain carbon steel.

Where the raw material inventory includes both wolframite and scheelite concentrates, it would be particularly desirable to provide a process for recovering tungsten from both wolframite and scheelite using only one leaching train and by using soda ash digestion in the combined leaching of wolframite and scheelite, for example, wolframite combined with low-grade scheelite concentrate, especially where the inventory of scheelite exceeds that for wolframite. Sometimes the as-mined ore may contain both wolframite and scheelite such as to provide a concentrate containing both.

Objects of the Invention

It is an object of the invention to provide an improved process for the simultaneous soda ash digestion of combined wolframite and scheelite concentrates.

Another object of the invention is to provide an improved process for the soda ash digestion of wolframite in combination with low-grade scheelite in an autoclave using an aqueous sodium carbonate solution of controlled concentration.

These and other objects will more clearly appear when taken in conjunction with the following disclosure and the appended claims.

SUMMARY OF THE INVENTION

In its broad embodiments, the invention is directed to a process for the soda digestion of a mixture of wolframite and scheelite concentrates, the process comprising forming a slurry of a blended composition of a wolframite and scheelite concentrate in an aqueous sodium carbonate solution of concentration ranging from about 50 gpl to 200 gpl at a $Na_2CO_3/WO_3$ weight ratio of about 0.9 to 2 and digesting the slurry in an autoclave at a temperature ranging from about 180° C. to 310° C. The pressure may range from 145 psig to 1430 psig.

In carrying out the process, the slurry is adjusted during digestion with an amount of sodium hydroxide predetermined by calculation to react substantially at least stoichiometrically with the $NaHCO_3$ formed as a result of the hydrolysis of $FeCO_3$ (and any $MnCO_3$ present) produced during digestion of wolframite to convert the $NaHCO_3$ back to $Na_2CO_3$. The amount of sodium hydroxide added is calculated to replace part of sodium carbonate within the range of $Na_2CO_3/WO_3$ weight ratio of about 0.9 to 2. It is preferred to add the sodium hydroxide by stage-wise addition during digestion as the $NaHCO_3$ is formed. Excess NaOH should be avoided in order to minimize the dissolution of gangue.

In carrying out the digestion with the predetermined amount of NaOH, the concentration of the $Na_2CO_3$ in the leach solution is inversely correlated to the digestion temperature and substantially directly correlated to the $Na_2CO_3/WO_3$ weight ratio, such as to effect dissolution of over 95% of the total $WO_3$ in the blended concentrates and provide a pregnant solution containing substantially all of the $WO_3$.

The foregoing process is particularly applicable to wolframite concentrates containing about 3% to 75% $WO_3$, e.g., about 40% to 75%, and to scheelite concentrate containing about 3% to 65% $WO_3$, e.g., about 10% to 40%. The term "scheelite" as used herein includes modifications thereof, such as powellite.

The ratio of wolframite to scheelite based on the $WO_3$ contents may range by weight from about 1:100 to 1:1, e.g., about 1:10 to 1:2. For example, assuming a weight ratio of 1:1 of $WO_3$-wolframite to $WO_3$-scheelite, and assuming that wolframite contains 75% $WO_3$ and scheelite 10% $WO_3$, the weight ratios of the concentrates by weight for wolframite to scheelite would be 1:7.5.

Assuming a weight ratio of $WO_3$-wolframite to $WO_3$-scheelite of 1:5 and that the same concentrations of $WO_3$ in each is the same as above, the weight ratio of the concentrates would be 1 part of wolframite to 37.5 parts of scheelite.

In a preferred mode of the invention, the concentration of $Na_2CO_3$ in the leach solution may range from about 120 to 180 gpl, the $Na_2CO_3/WO_3$ ratio from about 1 to 1.6 (e.g., about 1 to 1.4) and the temperature from about 200° C. to 250° C. or 270° C. at pressures ranging from 225 psig to 575 or 800 psig.

The key to attaining high $WO_3$ extraction for the combined addition of wolframite and scheelite is the addition of a small quantity of caustic to the soda ash leachant to neutralize the sodium bicarbonate ($NaHCO_3$) generated by the hydrolysis of iron and manganese carbonates as stated earlier, to wit:

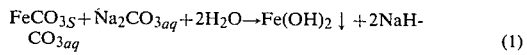

$$FeCO_{3S} + Na_2CO_{3aq} + 2H_2O \rightarrow Fe(OH)_2 \downarrow + 2NaHCO_{3aq} \tag{1}$$

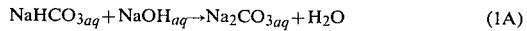

$$NaHCO_{3aq} + NaOH_{aq} \rightarrow Na_2CO_{3aq} + H_2O \tag{1A}$$

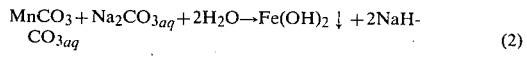

$$MnCO_3 + Na_2CO_{3aq} + 2H_2O \rightarrow Fe(OH)_2 \downarrow + 2NaHCO_{3aq} \tag{2}$$

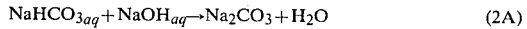

$$NaHCO_{3aq} + NaOH_{aq} \rightarrow Na_2CO_3 + H_2O \tag{2A}$$

The mole weight of $MnCO_3$ is very close to the mole weight of $FeCO_3$ (that is, within less than 1%). Thus, in referring to the hydrolysis of $FeCO_3$, the same applies to $MnCO_3$, if present. The reference in the claims to the hydrolysis of $FeCO_3$ is meant also to include the hydrolysis of $MnCO_3$, that is to say, is meant to cover $FeCO_3$ alone or $FeCO_3$ in combination with $MnCO_3$ (when present), since both compounds have approximately the same mole weight. The calculation of the stoichiometric amount of NaOH necessary to convert $NaHCO_3$ to $Na_2CO_3$ is made on that basis.

As in the related case, the concentration of $Na_2WO_4$ attained in the pregnant liquor during digestion is important in providing high dissolution yields. By increasing $Na_2CO_3$ to $Na_2WO_4$ weight ratio, extraction is increased. Conversely, decreasing this ratio or increasing the amount of $Na_2WO_4$ in the pregnant liquor will have a negative effect on the extraction efficiency.

Thus, to provide consistently high dissolution yields, the tungsten concentration constraints can be minimized by preferably leaching to not exceeding about 100 gpl $WO_3$, e.g., about 75 to 95 gpl, and, more preferably, over the range of approximately 90 to 95 gpl $WO_3$.

When the concentrate mix is digested, the pregnant liquor containing the sodium tungstate is further treated following filtration to remove such impurities as molybdenum. Any excess sodium carbonate is neutralized with acid and the pH adjusted to that value required to effect precipitation of Mo as $MoS_3$ using $H_2S$ as the precipitant. It is important that the $WO_3$/Mo ratio in the purified solution be very high, for example, 20,000/1. To achieve this, the ultimate pregnant solution should be at least about 100 gpl $WO_3$.

One method to achieve the foregoing requirements is to leach to a final $WO_3$ concentration of less than 100 gpl, for example, to a range of about 75 to 95 gpl, more preferably, approximately 90 to 95 gpl, to obtain a high dissolution yield and then subject the discharge pregnant liquor to flash down to evaporate sufficient solution to increase the concentration of $WO_3$ in the pregnant liquor at least 10% to increase the $WO_3$ concentration to over 100 gpl, e.g., up to about 120 or 140 gpl, and preferably at least about 15 or 20% of the original concentration as described in the related case.

As in the examples of the related application, the pressure digestion runs were conducted in a Parr two-liter titanium autoclave. Heat was provided by an electric heating mantle. A run was begun by adding a charge of concentrate to the reactor along with enough sodium carbonate solution to give the desired carbonate concentration and a slurry concentration of the desired percent solids. A small predetermined amount of NaOH was also added and heat applied to the system. Approximately one-half to three-quarters of an hour was required to reach the desired temperature of 230° C. Timing of the test began as soon as the temperature was reached. At the end of the run, the reactor was placed in a water bath, which cooled the slurry to approximately 70° C. The slurry was filtered hot with the solids being repulped and filtered three times using distilled water. The weight of wash water used in each repulp step was approximately one time the weight of solid residue. Analysis of the washed leach residue enabled calculation of tungsten extraction.

As described in the related application, the dry feed concentrate is peferably deoiled prior to digestion, such as in an electrically heated 3' diameter quartz kiln having a 12' hot zone, equipped with lifters, and rotating at 1 rpm. The kiln is horizontal and is operated batchwise using 100 to 300 g charges of concentrate. The kiln has a gas (air or oxygen) space rate throughout of 2.3 ft/minute at atmospheric pressure (Denver, Colorado). An alternative method for deoiling involves use of an oxygen overpressure during digestion. (Organic compounds in the feed were converted to $H_2O$, $CO_2$, sodium acetate, and traces of other organic derivatives, the composition of which depends on the flotation oils and humus in the feed.)

Tests were carried out in which wolframite concentrate per se was leached with caustic, while a mixture of wolframite and scheelite was leached with soda ash to which a small amount of caustic had been added for converting $NaHCO_3$ to $Na_2CO_3$ as it formed during digestion. The results obtained indicated the following conclusions:

1. Greater than 99% tungsten extraction was achieved upon autoclave-leaching a mixture of Climax wolframite and CanTung scheelite with soda ash containing a small amount of caustic. On a weight basis, the blend contained one part wolframite concentrate to nine parts scheelite concentrate, or one part $WO_3$ from wolframite to two parts $WO_3$ from scheelite. The pregnant liquor assayed 120 gpl $WO_3$ and 30 ppm $SiO_2$ prior to dilution with wash water.

2. Caustic digestion of Climax wolframite at pilot plant scale proceeded smoothly to achieve a tungsten extraction of 98.6%. The pregnant liquor assayed 270 gpl $WO_3$ and 33 ppm $SiO_2$ prior to dilution by wash water.

The foregoing conclusions will be clearly apparent from the following example.

EXAMPLE

The study included three samples of Climax high-grade wolframite concentrate (about 68% to 70% $WO_3$) and a low-grade scheelite concentrate (about 14.9% by weight $WO_3$) referred to as CanTung concentrate produced by the Canadian Tungsten Mining Corporation.

The analysis and particle size distribution of the concentrates are given in Table I below:

TABLE I

| Source | Sample 1 Climax | Sample 2A Climax | Sample 2B Climax | Sample 3 CanTung |
|---|---|---|---|---|
| $WO_3$,% | 70.2 | 68.1 | 68.1 | 14.9 |
| $SiO_2$,% | 0.78 | — | — | 2.4 |
| Fe,% | 6.9 | 9.3 | 9.3 | — |
| Mn,% | 9.6 | 12. | 12. | — |
| +150 mesh,% | 5.0 | 0* | 0* | 0.4 |
| −150/+200,% | 5.1 | 0 | 0 | 1.8 |
| −200/+270,% | 0.4 | 4.2 | 0 | 5.0 |
| −270/+400,% | 14.4 | 28.8 | 100* | 9.9 |
| −400 mesh,% | 75.1 | 67.0 | — | 83. |

*Tramp metal screened off prior to grinding.
**100% minus 270 mesh.

DIGESTION WITH CAUSTIC

The results of caustic leaching per se of wolframite concentrate are given in Tests Nos. 1 and 2 in Table II using Sample 2A of Table I. The two tests which were conducted in the laboratory in the two-liter Parr autoclave were followed by a pilot plant test designated as Test No. 3 using 11.5 kg of Sample 2B (Table I), 4.6 kg NaOH and 28 liters of water at 170° C. for four hours.

TABLE II

CAUSTIC LEACHING OF CLIMAX HIGH-GRADE WOLFRAMITE

| | Test No. | | |
|---|---|---|---|
| | 1 | 2 | 3 |
| Scale of Test | Lab | Lab | Pilot |
| Grind* | 100%−200 | 100%−200 | 100%−270 |
| Sample No. | 2A | 2A | 2B |
| Temperature, °C. | 160 | 160 | 170 |
| Time, hours | 4 | 4 | 4 |
| NaOH/$WO_3$, g/g** | 0.53 | 0.53 | 0.55 |
| NaOH, gpl | 170 | 85 | 165 |
| % Solids | 28 | 21 | 26 |
| $WO_3$ Extraction, % | 97.9 | 98.1 | 98.6 |

*Note Table I for size distributions
**Stoichiometric ratio is 0.345.

The two lab tests No. 1 and No. 2 exhibited a $WO_3$ extraction of 97.9% and 98.1%, respectively, while the pilot plant test No. 3 gave a $WO_3$ extraction of 98.6%. The solids weight loss was 65%. The filtration rate was rapid, the pregnant liquor prior to dilution with wash water containing 270 gpl $WO_3$. The silica content was 330 ppm, the final washed cake containing 73% solids.

SODA ASH DIGESTION

In tests conducted with Climax wolframite and Can-Tung scheelite combined, a feed ratio of 1 part $WO_3$ in wolframite to 4 parts $WO_3$ in scheelite was employed in the soda ash digestion run at a temperature of 230° C. for 2 hours. The discharge concentration of $WO_3$ was 110 to 120 gpl. The $WO_3$ extraction using a $Na_2CO_3$/$WO_3$ weight ratio of 1.2 was 94%. Normally, these conditions applied to scheelite alone (e.g., low-grade scheelite concentrate) yield an extraction efficiency of over 99%. However, when a weight ratio of $Na_2CO_3$/$WO_3$ of 1.08 was used together with NaOH/$WO_3$ of 0.09 (that is, 10% of stoichiometric replacement with caustic), the tungsten extraction efficiency was 99%.

As a result of the foregoing soda ash-NaOH run, a test was conducted using a higher wolframite/scheelite ratio as set forth in Table III below:

TABLE III

| Test No. | Sample No. | $O_2$, psig | Reagent Addition % of Stoich. | $Na_2CO_3$, gpl | NaOH gpl | $WO_3$ Extn.,% |
|---|---|---|---|---|---|---|
| 4 | 2A | 0 | 263 | 135 | 11 | 97.8 |
| 5 | 2A + 3* | 0 | " | " | " | 98.4 |
| 6 | " | 100 | " | " | " | 97.9 |
| 7 | " | 0 | " | 143 | 6 | 97.2 |
| 8 | " | 0 | " | 120 | 23 | 99.1 |
| 9 | " | 0 | 306 | 157 | 13 | 98.9 |

*One-to-Two ratio of wolframite to scheelite, based on weight contained $WO_3$.

Sample 2A (wolframite) was digested as shown in Test No. 4 without scheelite addition. By replacing 10% of the $Na_2CO_3$ with NaOH, the tungsten extraction was 97.8%. The experiment was repeated using a 1:2 blend of wolframite to scheelite based on the $WO_3$ content, without and with oxygen overpressure (Test Nos. 5 and 6). The tungsten extraction amounted to 98.4% and 97.9%, respectively.

In Test No. 8, the caustic substitution was increased to 20% which increased the tungsten extraction to 99.1%.

In Test No. 9, the total $Na_2CO_3$ reagent was increased to provide a $Na_2CO_3$/$WO_3$ weight ratio of 1.4. The tungsten extraction increased from 98.4% for Test No. 5 to 98.9% for Test No. 9.

Good filtration rates were obtained in the foregoing tests. The oxygenated slurry of Test No. 6 filtered somewhat slower than the others. The reduced $WO_3$ extraction in this test may be due to sulfide oxidation to sulfate which consumes leaching agent.

An advantage of the foregoing process is in the control of alkalinity and hence the inhibition of gangue dissolution. The stronger the alkalinity, the greater is the tendency for silica to dissolve in the pregnant liquor. It is therefore desirable to control the addition of NaOH to the soda ash leaching solution so that excess NaOH is avoided at any one time during digestion. One method is to add the NaOH stagewise in incremental portions or continuously so as to controllably react with the $NaHCO_3$ as it forms.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A process for the soda digestion of a mixture of wolframite and scheelite concentrates which comprises:
   forming a slurry of a combined mixture of a wolframite and scheelite concentrate in an aqueous sodium carbonate solution of a concentration ranging from about 50 gpl to 200 gpl at a $Na_2CO_3$/$WO_3$ weight ratio of about 0.9 to 2,
   digesting said slurry in an autoclave at a temperature ranging from about 180° C. to 310° C.,
   the concentration of the $Na_2CO_3$ solution being substantially inversely correlated to the digestion temperature and substantially directly correlated to the $Na_2CO_3$/$WO_3$ weight ratio,
   and while digesting said slurry, adding an amount of sodium hydroxide calculated at least stoichiometrically to react with $NaHCO_3$ formed as a result of the hydrolysis of $FeCO_3$ produced during the digestion of said wolframite and convert it to $Na_2CO_3$, the amount of NaOH added replacing a part of the sodium carbonate within the range of the $Na_2CO_3$/$WO_3$ weight ratio of about 0.9 to 2,
   such as to effect dissolution of over about 95% of the $WO_3$ in the mixed concentrate and provide a pregnant liquor containing substantially all of said $WO_3$.

2. The process of claim 1, wherein the wolframite contains about 3% to 75% $WO_3$ and the scheelite contains 3% to 65% $WO_3$, the concentration of $Na_2CO_3$ ranges from about 120 to 180 gpl, the $Na_2CO_3$/$WO_3$ weight ratio from about 1 to 1.6 and the temperature from about 200° C. to 270° C. at a pressure ranging from about 225 psig to 800 psig.

3. The process of claim 1, wherein the weight ratio of said wolframite to said scheelite based on the $WO_3$ contents ranges from about 1:100 to 1:1, the concentration of $Na_2CO_3$ ranges from about 120 to 180 gpl, the $Na_2CO_3$/$WO_3$ weight ratio from about 1 to 1.4 and the temperature from about 200° C. to 250° C.

4. The process of claim 3, wherein the concentration of $Na_2CO_3$, the temperature and the $Na_2CO_3$/$WO_3$ weight ratio are correlated such as to control the $WO_3$ concentration in the pregnant solution following digestion to a level not exceeding about 100 gpl, the digestion pressure ranging from about 225 psig to 575 psig.

5. The process of claim 4, wherein the $WO_3$ concentration in the pregnant liquor following digestion is controlled to a level ranging from about 75 gpl to 95 gpl.

6. The process of claim 4, wherein following substantially complete digestion of the $WO_3$ in the blended composition, the pregnant liquor is flashed to the atmosphere to effect evaporation of the pregnant liquor sufficient to increase the $WO_3$ concentration in said liquor by at least about 10% of the pregnant liquor concentration prior to flash down.

7. The process of claim 6, wherein the level of $WO_3$ in the pregnant liquor is approximately 90 to 95 gpl and the liquor thereafter is flashed to increase the $WO_3$ concentration by at least about 15%.

8. A process for the soda digestion of a mixture of a wolframite concentrate containing 3% to 75% $WO_3$ and a scheelite concentrate containing about 3% to 65% $WO_3$, which comprises:

forming a slurry of said composition in an aqueous sodium carbonate solution of a concentration ranging from about 50 gpl to 200 gpl at a $Na_2CO_3/WO_3$ weight ratio of about 0.9 to 2, digesting said slurry in an autoclave at a temperature ranging from about 180° C. to 310° C. at a pressure ranging from about 145 psig to 1430 psig, the concentration of the $Na_2CO_3$ solution being substantially inversely correlated to the digestion temperature and substantially directly correlated to the $Na_2CO_3/WO_3$ weight ratio, and while digesting said slurry, adding an amount of sodium hydroxide calculated at least stoichiometrically to react with $NaHCO_3$ formed as a result of the hydrolysis of $FeCO_3$ produced during the digestion of said wolframite and convert it to $Na_2CO_3$, the amount of NaOH added replacing a part of the sodium carbonate within the range of the $Na_2CO_3/WO_3$ weight ratio of about 0.9 to 2, such as to effect the dissolution of over about 95% of the $WO_3$ in the blended concentrate and provide a pregnant liquor containing substantially all of said $WO_3$.

9. The process of claim 8, wherein the weight ratio of said wolframite to said scheelite based on the $WO_3$ contents ranges from about 1:100 to 1:1 and wherein the concentration of $Na_2CO_3$ ranges from about 120 to 180 gpl, the $Na_2CO_3/WO_3$ weight ratio from about 1 to 1.6, the temperature from about 200° C. to 270° C. and the pressure from about 225 psig to 800 psig.

10. The process of claim 8, wherein the concentration of $Na_2CO_3$ ranges from about 75 to 150 gpl, the $Na_2CO_3/WO_3$ weight ratio from about 1 to 1.4 and the temperature from about 200° C. to 250° C.

11. The process of claim 10, wherein the concentration of $Na_2CO_3$, the temperature and the $Na_2CO_3/WO_3$ weight ratio are correlated such as to control the $WO_3$ concentration in the pregnant solution following digestion to a level not exceeding about 100 gpl.

12. The process of claim 11, wherein the $WO_3$ concentration in the pregnant liquor following digestion is controlled to a level ranging from about 75 gpl to 95 gpl.

13. The process of claim 11, wherein following substantially complete digestion of the $WO_3$ in the mixed composition, the pregnant liquor is flashed to the atmosphere to effect evaporation of the pregnant liquor sufficient to increase the $WO_3$ concentration in said liquor by at least about 10% of the pregnant liquor concentration prior to flash down.

14. The process of claim 13, wherein the level of $WO_3$ in the pregnant liquor is approximately 90 to 95 gpl and the liquor thereafter flashed to increase the $WO_3$ concentration by at least about 15% of the original concentration.

15. A process for the soda digestion of a mixture of wolframite and scheelite concentrates in which the wolframite concentrate contains 3% to 75% $WO_3$, the scheelite concentrate contains 3% to 65% $WO_3$, the weight ratio of said wolframite to said scheelite based on the $WO_3$ contents ranges from 1:100 to 1:1, which comprises:

forming a slurry of a blended composition of a wolframite and scheelite concentrate in an aqueous sodium carbonate solution of a concentration ranging from about 50 gpl to 200 gpl at a $Na_2CO_3/WO_3$ weight ratio of about 0.9 to 2, digesting said slurry in an autoclave at a temperature ranging from about 180° C. to 310° C. and a pressure ranging from about 145 psig to 1430 psig, the concentration of the $Na_2CO_3$ solution being substantially inversely correlated to the digestion temperature and substantially directly correlated to the $Na_2CO_3/WO_3$ weight ratio, and while digesting said slurry, adding an amount of sodium hydroxide calculated at least stoichiometrically to react with $NaHCO_3$ formed as a result of the hydrolysis of $FeCO_3$ produced during the digestion of said wolframite and convert it to $Na_2CO_3$, the amount of NaOH added replacing a part of the sodium carbonate within the range of the $Na_2CO_3/WO_3$ weight ratio of about 0.9 to 2, such as to effect dissolution of over about 95% of the $WO_3$ in the blended concentrate and provide a pregnant liquor containing substantially all of said $WO_3$.

16. The process of claim 15, wherein the concentration of $Na_2CO_3$ ranges from about 120 to 180 gpl, the $Na_2CO_3/WO_3$ weight ratio from about 1 to 1.6, the temperature ranging from about 200° C. to 270° C., and the pressure from about 225 psig to 800 psig.

17. The process of claim 15, wherein the concentration of $Na_2CO_3$ ranges from about 120 to 180 gpl, the $Na_2CO_3/WO_3$ weight ratio from about 1 to 1.4 and the temperature from about 200° C. to 250° C.

18. The process of claim 15, wherein the $WO_3$ concentration in the pregnant liquor following digestion is controlled to a level ranging from about 75 gpl to 95 gpl over a temperature range of about 200° C. to 250° C., and wherein the pregnant solution is flashed to the atmosphere to increase the $WO_3$ concentration by at least about 10%.

19. The process of claim 18, wherein the level of $WO_3$ in the pregnant liquor is approximately 90 to 95 gpl and the flash down of said liquor is such as to increase the $WO_3$ concentration by at least about 15%.

* * * * *